Oct. 1, 1929.  W. J. O. JOHNSON  1,729,724
SAUSAGE TWISTING MACHINE
Original Filed Oct. 3, 1924   7 Sheets-Sheet 1
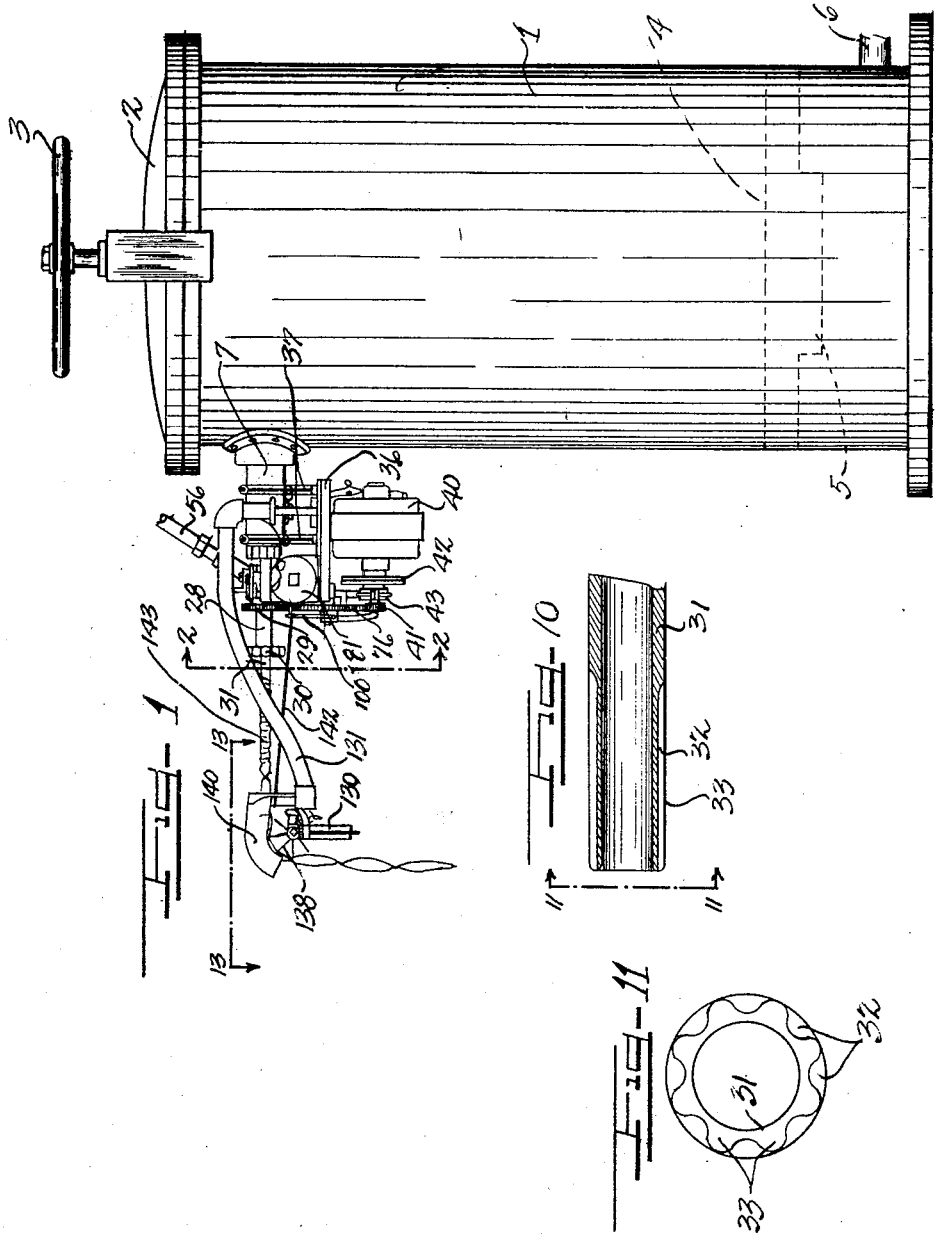
INVENTOR
Walter J. O. Johnson
by Charles Hill
Attys.

Oct. 1, 1929.  W. J. O. JOHNSON  1,729,724
SAUSAGE TWISTING MACHINE
Original Filed Oct. 3, 1924  7 Sheets-Sheet 2
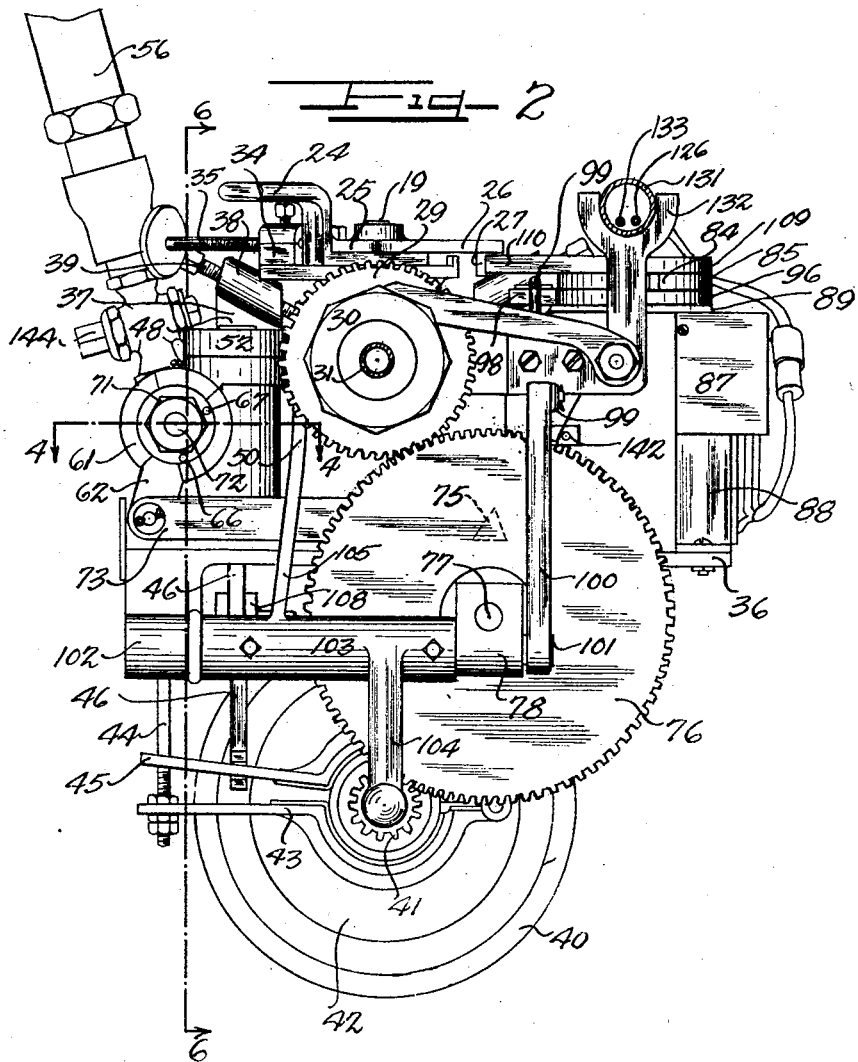

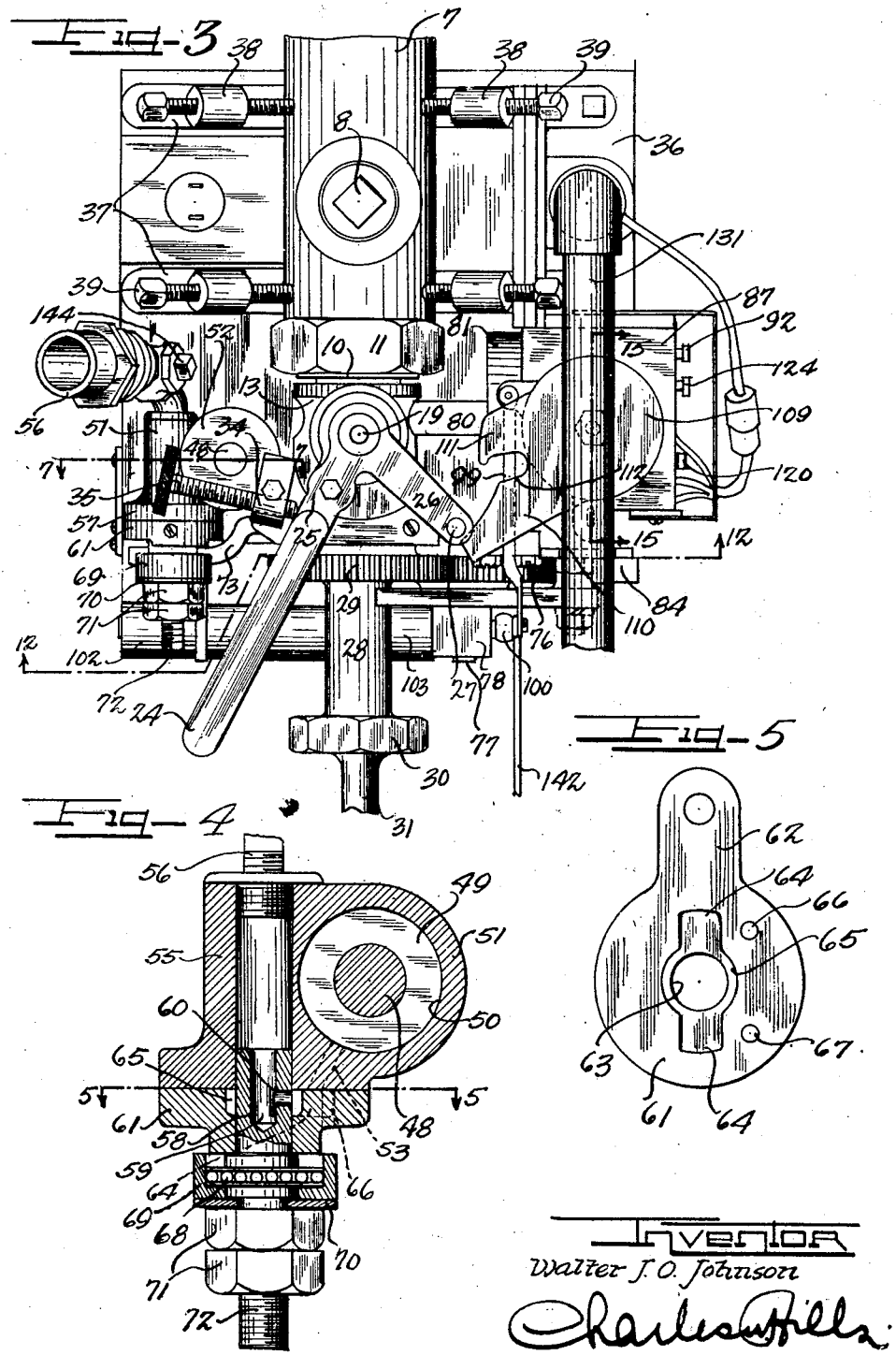

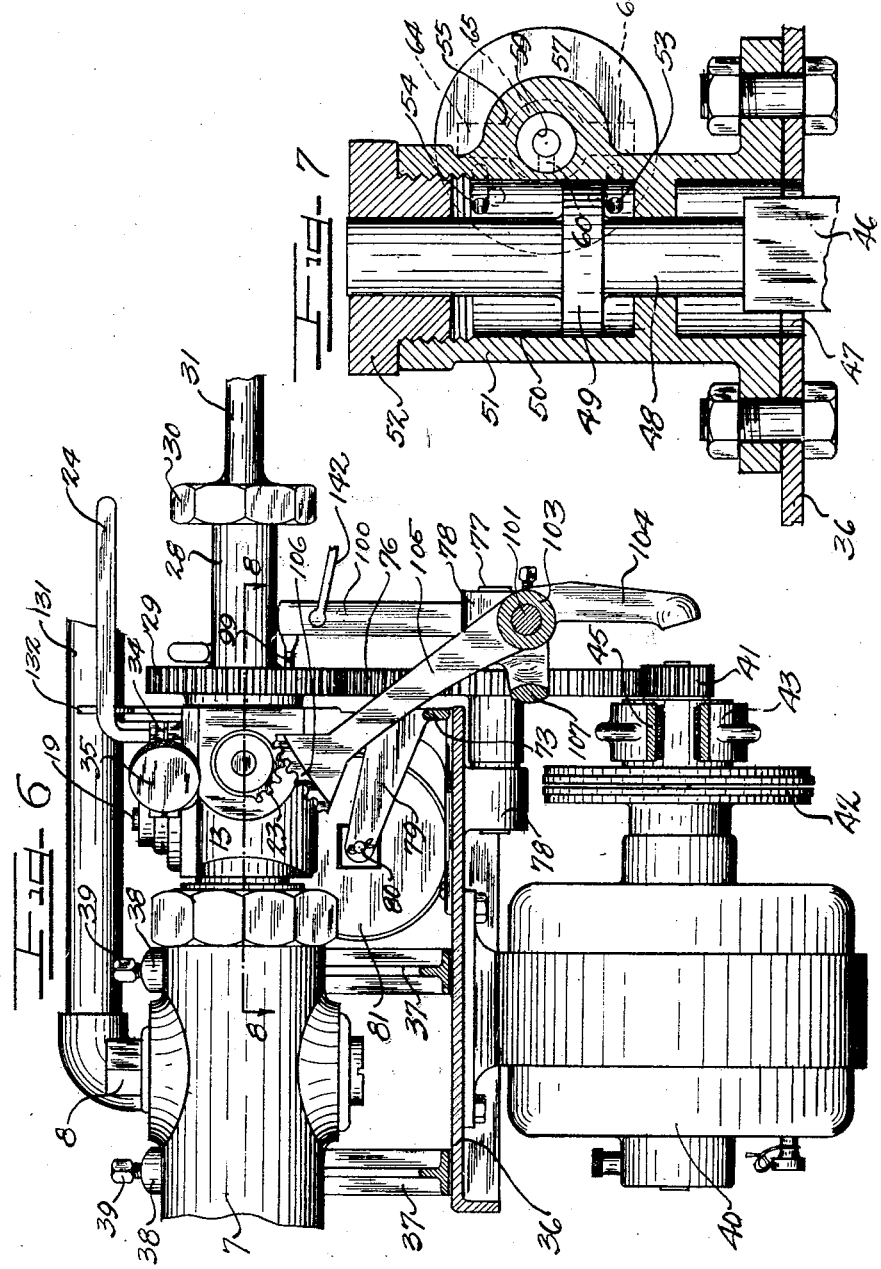

Oct. 1, 1929.  W. J. O. JOHNSON  1,729,724
SAUSAGE TWISTING MACHINE
Original Filed Oct. 3, 1924   7 Sheets-Sheet 5
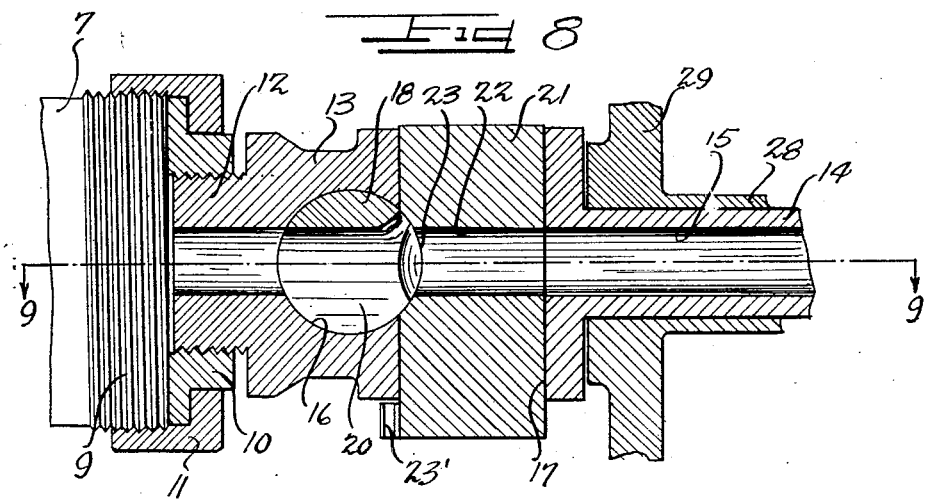
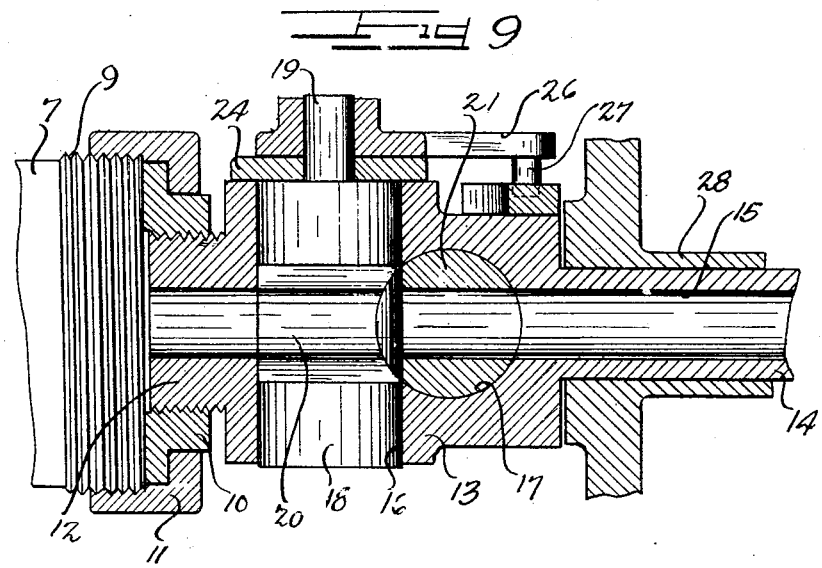
Inventor
Walter J. O. Johnson.
by
Attys.

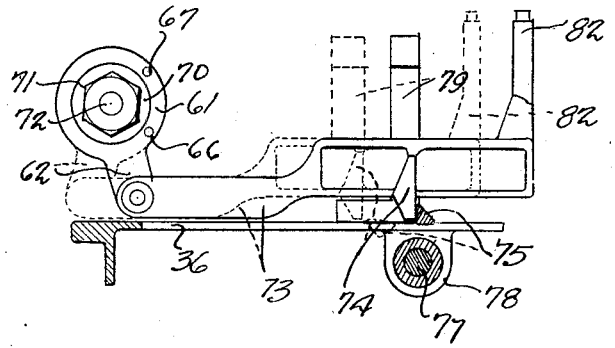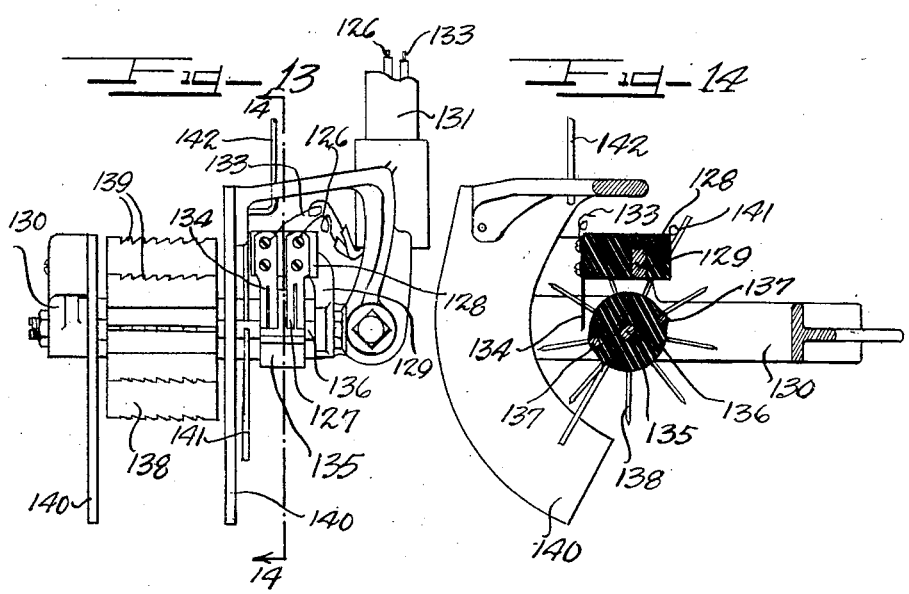

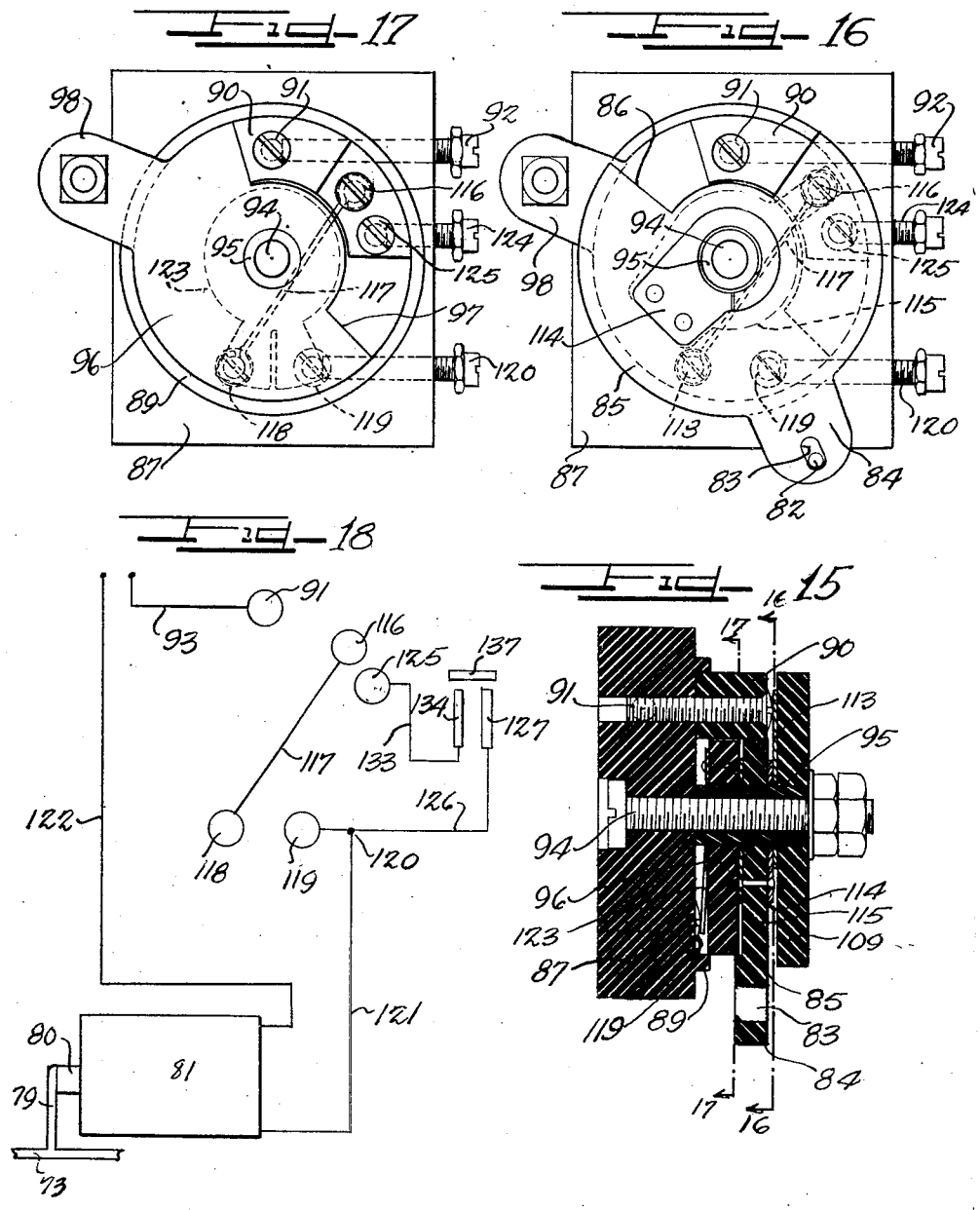

Patented Oct. 1, 1929

1,729,724

UNITED STATES PATENT OFFICE

WALTER J. O. JOHNSON, OF CHICAGO, ILLINOIS, ASSIGNOR TO THE ALLBRIGHT-NELL COMPANY, OF CHICAGO, ILLINOIS, A CORPORATION OF ILLINOIS

SAUSAGE-TWISTING MACHINE

Application filed October 3, 1924, Serial No. 741,333. Renewed January 12, 1928.

It is an object of this invention to provide an improved machine adapted to automatically fill and link sausage casings.

It is also an object of this invention to provide a machine adapted to be readily attached to a sausage meat feed container and further adapted to automatically twist a filled sausage casing at selected intervals to produce a link of sausages.

Another object of the invention is to provide a sausage linking machine adapted to be readily supported on the outlet pipe of a sausage meat supply tank to permit the sausage meat to be fed into intestines or sausage casings which are adapted to be automatically twisted at predetermined intervals to form links of sausages.

It is a further object of this invention to provide a sausage linking machine wherein the casing filling mechanisms and the casing twisting mechanisms are adapted to be automatically controlled by electrical switch means.

It is furthermore an object of this invention to provide a sausage twisting or linking machine wherein a sausage feed reel governs the operation of electrical means which control the feeding and twisting mechanisms of the machine.

Still another object of the invention is the construction of a sausage linking machine adapted to be supported on a sausage meat supply pipe and having mechanisms for filling a sausage casing and automatically twisting said casing at predetermined intervals depending upon the rotation of a sausage feed reel and a commutator rotated thereby.

It is an important object of this invention to provide a sausage linking machine of simplified and compact construction adapted to be readily attached to the outlet pipe of a sausage meat supply tank and further adapted to automatically permit sausage meat to be fed into a casing and so constructed and adjusted that a twisting operation of the sausage casing takes place automatically as the stuffed sausage casing causes rotation of a control reel which governs the operation of electrical switch mechanisms.

Other and further important objects of this invention will be apparent from the disclosures in the specification and the accompanying drawings.

This invention (in a preferred form) is illustrated in the drawings and hereinafter more fully described.

On the drawings:

Figure 1 is an elevational view of a sausage meat supply container having a sausage linking machine embodying the principles of this invention supported on the container outlet pipe.

Figure 2 is an enlarged sectional end view taken on line 2—2 of Figure 1.

Figure 3 is a top plan view of the portion of the sausage linking machine illustrated in Figure 2.

Figure 4 is an enlarged fragmentary detail section taken on the line 4—4 of Figure 2 showing parts in plan.

Figure 5 is a detail elevational view taken on line 5—5 of Figure 4 with parts omitted.

Figure 6 is a detail sectional view taken on line 6—6 of Figure 2 with parts omitted.

Figure 7 is an enlarged detail section of the air valve mechanism taken on line 7—7 of Figure 3.

Figure 8 is an enlarged detail section of the sausage meat supply valve mechanism taken on line 8—8 of Figure 6.

Figure 9 is an enlarged fragmentary detail section taken on line 9—9 of Figure 8.

Figure 10 is an enlarged fragmentary longitudinal section of the fluted or tip end of the sausage meat supply nozzle or pipe.

Figure 11 is an enlarged end view of the sausage meat supply nozzle taken on the line 11—11 of Figure 10.

Figure 12 is a fragmentary sectional view with parts omitted taken on the line 12—12 of Figure 3 showing the operation in dotted lines.

Figure 13 is an enlarged plan view taken on the line 13—13 of Figure 1 illustrating the sausage feed reel and an electrical control means governed thereby.

Figure 14 is a detail sectional view taken on line 14—14 of Figure 13.

Figure 15 is an enlarged fragmentary sectional view of the switch control mechanism taken on the line 15—15 of Figure 3 with parts omitted.

Figure 16 is a plan view of the switch mechanism taken on the line 16—16 of Figure 15.

Figure 17 is a detail plan view of the switch mechanism taken on the line 17—17 of Figure 15.

Figure 18 is a wiring diagram of the electrical control mechanisms.

As shown on the drawings:

The reference numeral 1 indicates a sausage meat supply tank or container provided with an air tight cover 2 adapted to be held in place by a clamping mechanism 3. Slidably mounted within the tank 1 is a sausage meat feed plate or plunger 4 (Figure 1) the bottom of which is provided with a boss 5 so that an air space is provided beneath the plunger when the plunger boss rests upon the bottom of the container. Connected with the lower end of the container 1 is a compressed air pipe 6 adapted to supply compressed air into the lower portion of the container below the plunger plate 4 to gradually raise the same for the purpose of forcing the sausage meat in the container above the plunger out of a sausage meat outlet pipe 7 supported near the upper end of the container. The sausage meat outlet pipe 7 is provided with a shut-off valve mechanism 8 which may be of any desired construction.

Clamped against the threaded end 9 of the sausage meat supply pipe 7 is an internally threaded flanged ring 10 which is held in clamped position by an internally threaded ring cap 11. Threaded into the ring 10 is an externally threaded hub or shank 12 which is integrally formed on one side of a sausage meat control block or casting 13 having a sleeve 14 integrally formed on the second end thereof and having a sausage meat supply passage 15 therein which continues axially through the entire casting 13 and the casting supporting shank 12. The casting 13 is drilled transversely at right angles to afford intersecting drillings or cylindrical valve seats 16 and 17. Rotatably mounted in the valve seat 16 is a cylindrical valve 18 having a stub shaft 19 integrally formed on the upper end thereof. The valve 18 has a transverse passage 20 adapted when the valve 18 is in open position to register with the passage 15 in the supporting end of the casting 13 as illustrated in Figure 8. Rotatably mounted within the valve seat 17 of the casting 13 is a sausage meat shut-off valve 21 having a diametric passage 22 and a recess portion 23, with the recess portion 23 positioned to receive a portion of the valve 18. The valve passages 20 and 22 are adapted to be aligned with one another when the valves 18 and 21 are in open position as illustrated in Figures 8 and 9. Integrally formed on one projecting end of the valve 21 is a gear segment 23' by which said valve is adapted to be operated as hereinafter described.

Rigidly secured to the stub shaft 19 on the valve 18 is a starting lever 24 to which a short bell crank arm 25 is bolted or otherwise secured. The bell crank arm comprises the short arm 25 and a long switch control arm 26. The bell crank 25—26 is also engaged on the stub shaft 19 to permit manual rotation of the control valve 18 when the lever 24 is manually operated. Secured to the end of the long bell crank arm 26 is a downwardly directed switch operating pin 27.

Rotatably mounted on the passaged sleeve or stem 14 of the casting 13 is a sleeve 28 having a small gear 29 integrally formed on the inner end thereof. Rigidly secured to the outer end of the sleeve 28 by means of a nut cap 30 is the inner end of a sausage casing receiving pipe or nozzle 31 the outer end of which is provided with a plurality of longitudinal grooves 32 leaving longitudinally rounded ribs 33 as illustrated in Figures 10 and 11. The ends of the nozzle ribs 33 are also rounded so that sausage casings may be easily put on or taken off of the nozzle.

Supported upon the top of the casting 13 is an internally threaded split bracket 34 through which a manually adjustable set screw 35 projects. The set screw 35 is adapted to be contacted by the starting lever 24 when in its open position as illustrated in Figure 3 and controls the degree to which the sausage meat control valve 18 is adapted to be opened, so that the quantity of sausage meat passing from the supply pipe 7 into the sausage twisting machine may be regulated.

A mounting plate or platform 36 forms a part of the machine and has rigidly secured thereon by bolts or other suitable means a pair of U-shaped brackets or standards 37 the upwardly projecting arms of which have a plurality of internally threaded sleeves 38 integrally formed thereon in inclined relation for the purpose of supporting a plurality of adjustable supporting screws 39. The screws 39 are adapted to engage against the sausage meat supply pipe 7 to hold the platform 36 rigidly clamped in position. Supported on the bottom of the mounting plate 36 is an electric motor 40 having a pinion 41 mounted on one end of the motor shaft as illustrated in Figure 6. Mounted on the motor shaft between the motor and the pinion 41 is a clutch 42 and a brake 43. One arm of the brake 43 is supported from the mounting platform 36 by means of a supporting bolt 44 while the movable arm 45 (Figure 2) of the brake has the lower end of a brake operating arm 46 engaged therewith to permit operation of the brake 43. The upper end of the brake operating arm 46 projects through an opening 47 (Figure 7) in the mounting plate 36 and is connected to the lower end of a piston rod or stem 48 having a piston 49 integrally formed thereon intermediate the ends thereof. The piston 49 is slidable within a chamber 50 provided with a cylindrical casing 51 the upper end of which is open and internally threaded to receive the threaded shank of an axially passaged cap or plug 52. The upper end of the piston rod 48 projects through the passaged plug 52 while the lower portion of said piston rod 48 projects through an apertured partition formed within the casing 51. The casing 51 is provided with compressed air ports 53 and 54 which communicate with the casing chamber 50 above and below the piston 49. Integrally formed on the side of the casing 51 is a compressed air inlet sleeve 55 having a compressed air supply pipe 56 attached in one end thereof. The pipe 56 may be connected with any suitable source of supply of compressed air. The sleeve 55 is provided with an integral flange 57 into which a valve 58 projects. The valve 58 is provided with an axial passage 59 (Figure 4) and a radial port or passage 60. Rotatably engaged on the valve 58 adjacent the flange 57 of the air inlet sleeve 55 is a control disc or plate 61 having an integrally apertured extension or arm 62 radially formed thereon. As illustrated in Figure 5 the control disc 61 is provided with an axial opening 63 and an air inlet recess comprising oppositely disposed arms or pockets 64 connected by an enlarged middle portion 65 which communicates with the passage 63. The control disc 61 is also provided with air outlet ports 66 and 67. Mounted on an extension of the valve 58 to the outside of the control disc 61 is a ball bearing 68 held in position by a retaining cap 69 and a washer 70. Locknuts 71 are threaded on the outer threaded end 72 of the valve 58 for the purpose of holding the control disc 61 in proper operating position.

Pivotally connected to the apertured end of the arm 62 of the control disc 61, as illustrated in Figures 2 and 12, is one end of a slidable control bar 73 which is positioned above the mounting plate 36 and is adapted to be reciprocated to control the operation of the control disc 61. Formed on the reciprocating bar 73 is a shoe 74 with which a lug 75 is adapted to coact to return the reciprocating bar from the full line position in Figure 12 to the dotted line position. The lug 75 is integrally formed on the inner surface of a large gear 76 which is in mesh with the pinion 41 and with the gear 29. The large gear 76 is rotatably supported on a shaft 77 the ends of which are journalled in bearings 78. Also integrally formed on the reciprocating bar 73 is an upwardly directed arm 79 the end of which is connected with the outer projecting end of a core 80 of a solenoid 81. The solenoid 81 is mounted upon the top of the mounting plate 36 as illustrated in Figure 6. Integrally formed on the end of the reciprocating bar 73 is a control arm 82 the upper end of which is formed to afford a finger or pin which projects upwardly through a slot 83 provided in a radial arm 84 which is integrally formed on an intermediate control switch disc or plate 85 as illustrated in Figure 16. The switch plate 85 is of circular form having a segment shaped notch 86 cut in the peripheral margin thereof.

The control switch mechanism is clearly illustrated in Figures 15, 16 and 17 and comprises an insulation base 87 which is mounted in position on supporting brackets 88 secured upon the mounting plate 36. Integrally formed on the upper surface of the switch base 87 is a ring or circular rib 89. Secured upon the top of the switch block 87 against the inner periphery of the ring 89 is a terminal block 90 of insulation material. The block 90 is held in position by means of a terminal screw 91 the inner end of which is in contact with the inner end of a line terminal screw 92 to which one end of a circuit line 93 is attached. The line terminal screw 92 is mounted in the switch block 87. Projecting through the switch block 87 is a retainer bolt 94 having an insulation sleeve 95 engaged thereon. Mounted on the insulation sleeve 95 below the control disc 85 is an insulation disc 96 having a segment of the peripheral margin cut away as indicated at 97 (Figure 17). Integrally formed on the periphery of the disc 96 is a radial arm or projection 98 to which one end of a connecting link 99 is pivotally connected. The other end of the connecting link 99 (Figure 3) is pivotally connected to the upper end of a crank arm 100. The lower end of the crank arm 100 is secured to one projecting end of a shaft 101 to be actuated thereby. The shaft 101 is supported in the bearing 78 and in a bearing 102. Mounted on the shaft 101 between the bearings 78 and 102 is a hub or sleeve 103 having a downwardly directed clutch control arm 104 and an upwardly directed arm 105 on the end of which a gear segment 106 is formed. The gear segment 106 is in mesh with the gear segment 23 which controls the operation of the valve 21.

Integrally formed on the sleeve 103 is a parallel arm 107 one end of which is bent at an angle and is integrally connected with said sleeve 103 (Figure 6). The other end of the control arm 107 is provided with an integral yoke 108 (Figure 2) through which the middle portion of a brake operating arm 46 projects, said brake arm being pivotally connected to the yoke member 108.

Referring back to Figure 15 the switch control mechanism furthermore comprises an upper insulation disk 109 which is mounted on the insulation sleeve 95 to the outside of the disk 85. Integrally formed on the outer disk 109 is a long arm 110 and a short arm 111 separated by a notch 112 (Figure 3) with which the switch operating pin 27 is adapted to coact to cause movement of the outer switch control disk 109 when the bell crank 25—26 is manually operated by means of the starting lever 24. Secured to the under face of the control disk 109 is a contact plate 113 adapted to contact with a contact plate 114 secured on the outer surface of the intermediate disk 85. The contact disk 114 is connected through the disk 85 with a lower contact plate 115 and a terminal 116 to which one end of a connecting wire 117 is attached. The other end of the connecting wire is connected to a terminal screw 118 supported in the switch block 87. A terminal screw 119 is also mounted in the switch block 87 and is connected with a terminal post 120 also mounted within the switch block 87. A wire 121 connects the terminal post 120 with one terminal of the solenoid 81. The other terminal of the solenoid 81 has one end of a wire 122 connected thereto. The other end of the wire 122 affords the second line wire connection which leads to the source of power. Mounted on the bottom of the lower switch disk 96 is a contact plate 123 for connecting the two terminals 118 and 119 when the lower disk 96 is moved into the position illustrated in Figure 17. Also mounted in the switch block 87 is a terminal post 124 the inner end of which connects with a terminal screw 125, also mounted within the switch block 87. Connected to the terminal post 120 is one end of a wire 126 the other end of which is connected to a commutator brush 127 supported on an insulating block 128 which is mounted on a bracket arm 129 formed on a U-frame 130. The U-frame 130 is supported by means of a pipe arm 131 one end of which is rigidly supported upon the mounting plate 36. The pipe arm 131 is also supported by a yoke 132 (Figure 2) and serves as a conduit for the wire 126 and a second wire 133. One end of the wire 133 is connected to a second commutator brush 134 which is also mounted on the insulation block 128. The other end of the wire 133 is connected with the terminal post 124 which has contact with the terminal screw 125. The two commutator or contact brushes 127 and 134 are adapted to track on the periphery of an insulation commutator 135 which is mounted on a shaft 136 supported in bearings on the U-frame 130 (Figure 14). The commutator 135 is provided with two oppositely disposed contact bars 137 to afford a means for making a connection between the two commutator brushes 127 and 134 twice in each revolution of the commutator 135. Also secured to the shaft 136 is a sausage feed reel 138 comprising a plurality of radially directed spoke plates the outer edges of which are slightly notched or corrugated as indicated at 139 (Figure 13). The sausage feed reel is positioned between guide plates or shields 140 supported on the U-frame 130. Projecting diametrically through the sausage feed reel shaft 136 at a point between the commutator 135 and one of the guide plates 140 (Figure 13) is a control rod 141 the ends of which are adapted to be brought into contact with the bent ends of a control bar 142 one end of which is connected to the crank arm 100. The control bar 142 is provided for the purpose of stopping the rotation of the sausage feed reel 138 at predetermined times in order to control the length of the sausage so that all the sausages forming a link or chain of sausages will be of equal length.

The operation is as follows:

The supply tank or container 1 is adapted to be filled with sausage meat and when compressed air is admitted into the pipe 6 and into the lower portion of the container, the plunger plate 4 is forced upwardly within the tank 1 thereby causing the sausage meat to be forced out through the outlet pipe 7 when the control valve 8 is open.

The improved sausage linking machine of this invention is adapted to be clamped upon the sausage meat outlet pipe 7 by means of the clamping screws 37 as indicated in Figure 3. The machine is thus rigidly held in position as indicated in Figure 1 with the valve casting 13 secured to the open end of the outlet pipe 7 by means of the flanged ring 10 and the retaining cap 11 as illustrated in Figures 8 and 9.

At the beginning of a sausage linking operation an intestine or sausage casing 143 is slipped onto the nozzle 31 over the fluted end thereof as indicated in Figure 1. An end of the sausage casing is permitted to hang over the end of the nozzle.

When the control valve 8 is open sausage meat from the tank 1 passes through the pipe 7 and into the inlet passage of the valve casing. The valve 18 is now opened a predetermined amount by moving the starting lever 24 into the position illustrated in Figure 3 against the set screw 35 which may be set as desired to govern the quantity of sausage meat passing through the valve 18.

When the starting lever 24 is thrown into the full line position shown in Figure 3 the pin 27 moves the upper switch disk 109 into the position shown in Figure 3 so that the contact plate 113 on the inner side of the disk 109 is moved into contact with the terminal screw 91. The contact plate 113 is then in contact with the outer contact plate 114 on the disk 85 so that a circuit is established from the line wire 93 and the terminal screw 91 through the contact plates 113 and 114 and to the contact plate 115 which has an arm thereon adapted to be positioned to contact the terminal screw 125. It will thus be seen that at the beginning of the operation when the starting lever 24 is operated that a connection is established (Figure 18) between the terminals 91 and 125 by means of the contact plate 113 being moved into engagement with the terminal screw 91 while the contact plates 114 and 115 complete the connection to the terminal 125.

When the compressed air control valve 144 is opened, previous to the operation of the lever 24 and with compressed air having been admitted into the upper portion of the chamber 50 (Figure 7) the brake arm 46 is in its lowered position thereby setting the brake 43 and operating the sleeve 103 through the arm 107 so that the clutch is thrown out and the gear segment 106 has been moved into a position to open the sausage meat control valve 21 into the position illustrated in Figures 8 and 9. With the valve 21 in open position sausage meat from the pipe 7 passes through the valve passage 20 of the open valve 18 through the passage 22 of the open valve 21 and into the passage 15 of the sleeve 14. From the sleeve 14 the sausage meat passes into the rotatable nozzle 31 and then into the sausage casing 143. The sausage casing is thus filled with sausage meat thereby gradually forcing the sausage casing off of the fluted end of the nozzle 31 to form a sausage which is adapted to be conducted between the guides 140 over the sausage feed reel 138. As the sausage casing is filled with meat an operator controls the movement of the sausage casing by his fingers thereby governing the movement of the casings as meat is delivered thereto.

With the forming of the preliminary or first sausage said sausage being conducted over the reel 138 causes said reel to rotate thereby rotating the shaft 136 to cause rotation of the commutator 135. When the sausage meat control valve 18 is open the contact plate 123 is in the dotted line position of Figure 17 and connects the terminals 118 and 119. As the commutator 135 is rotated one of the terminal bars 137 is brought into contact with the commutator brushes 127 and 134 (see Figure 18) thereby establishing an electrical circuit through the solenoid 81, the terminals 91 and 125 being connected as already described. With the energization of the solenoid 81 the solenoid core is drawn inwardly thereby causing the arm 79 to be moved from the dotted line position of Figure 12 to the full line position of said figure. Movement of the arm 79 as described causes the reciprocating bar 73 to move from the dotted line position (Figure 12) to the full line position, at the same time moving the control disk 61 so that compressed air from the valve 58 is permitted to enter the lower portion of the piston chamber 50 (Figure 7) to cause upward movement of the piston 49 and discharge of the air above said valve through the port 54 and the outlet port 67 of the control disk. When the reciprocating bar 73 is moved into the full line position of Figure 12 the finger 82 acting through the apertured arm 84 moves the intermediate switch disk 85 into the full line position of Figure 16 thereby causing the lower contact plate 115 to move out of contact with the terminal screw 125 into contact with the terminal 116 thereby breaking the circuit to the commutator.

At this point in the operation the brake control bar is moved upwardly by the upward movement of the piston 49 thereby causing the control sleeve 103 to rotate thereby first causing the gear segment 106 to operate the gear segment 23 to close the sausage meat control valve 21. The control arm 104 is now moved into a position to throw in the clutch 42 after the brake 43 is released. The pinion 41 thus receives a drive from the motor and acts to drive the large gear 76 which in turn rotates the smaller gear 29. With each rotation of the larger gear 76 the small gear 29 is rotated a plurality of times to cause rotation of the nozzle 31 and the sausage casing engaged thereon. The portion of the sausage casing already filled is held against rotation by reel plates 138 so that the sausage casing is twisted a number of turns as shown in Figure 1.

With the throwing in of the clutch and the closing of the valve the arm 100 is also actuated to operate the connecting link 99 to move the lower switch disk 96 into a position to cause the contact plate 123 to break the connection between the terminals 118 and 119 (Figure 18). It will thus be noted that the circuit to the solenoid 81 is broken with the reciprocating bar 73 in the full line position shown in Figure 12 until the lug 75 on the inner side of the gear 76 comes into contact with the shoe 74 on the reciprocating bar 73 as illustrated in Figure 12. When this occurs the lug 75 acts to push the bar 73 from the full line position of Figure 12 back into the dotted line position of said figure thereby causing a reverse operation of the air piston 49 thus throwing out the clutch 42, causing opening of the meat control valve 21 and applying of the brake 43. The connection between the terminals 118 and 119 is established when the sausage meat control valve 21 is opened. A quantity of sausage meat is again discharged into the sausage casing 143 to form the next sausage while the casing already stuffed causes actuation of the reel 138 and commutator 135 until another contact bar 137 on the commutator is brought into contact with the commutator brushes 127 and 134. The operation now repeats itself thereby permitting a link of sausages of equal length to be made. As the reel 138 rotates the reel shaft 136 is also rotated thereby causing one of the control bars or arms 141 to be engaged by the hooked end of the connecting rod 142 which is actuated by means of the arm 100 each time the control sleeve 103 is rocked or rotated. The connecting rod 142 acts to hold the reel 138 against rotation so that a sausage of the required length is automatically formed.

The contact bars 137 on the commutator 135 are two in number so that two connections are established between the commutator brushes 127 and 134 with each revolution of the commutator 135 and the sausage feed reel 138. This arrangement determines the exact length of the sausages which form the link of sausages. The length of the sausages may be changed by varying the diameter of the reel 138 or by varying the number of contact bars 137 on the commutator 135 so that the length of the sausage casings is shortened or lengthened as desired.

When the end of the sausage casing 133 is reached the operator merely throws the starting lever 24 from the position illustrated in Figure 3 into its normal position whereby the connection between the terminal screw 91 and the contact plate 113 on the switch disk 109 is broken and the sausage meat control valve 18 is closed.

As illustrated in Figures 10 and 11 the end of the nozzle 31 is fluted or corrugated and the edges rounded so that there will be no danger of mutilating the sausage casing as it moves off of the nozzle to be filled with sausage meat.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. The combination with a sausage meat container and the outlet pipe thereof, of a sausage linking machine removably clamped to said outlet pipe and comprising a rotatable nozzle, a plurality of control valves positioned between said nozzle and the container outlet pipe to control the flow of sausage meat from the container through the nozzle and into a sausage casing engaged on the nozzle, a driving mechanism, a clutch and a brake associated with the driving mechanism, a brake actuating bar, a compressed air valve mechanism for actuating said brake actuating bar, gear means for connecting the driving mechanism with said rotatable nozzle, and a control member connected to be actuated by the brake actuating bar to simultaneously cause release of the brake, throwing in of the clutch and closing of one of the sausage meat control valves to permit the gear means to be driven by the driving means to cause rotation of the nozzle and twisting of the sausage casing.

2. The combination with a sausage meat supply pipe, of a sausage twisting machine removably supported thereon comprising a rotatable sausage meat outlet nozzle adapted to have a sausage casing engaged thereon, a sausage meat control valve positioned between the nozzle and the sausage meat supply pipe, a rotatable control sleeve, means thereon connected to operate said sausage meat control valve, a clutch control arm also formed on said sleeve, a brake control arm connected to be actuated by said sleeve, a brake connected to said brake control arm, a driving mechanism, a clutch positioned between said driving mechanism and said brake, gear means for transmitting a drive from said driving mechanism to said rotatable nozzle, a compressed air control valve connected to operate said brake control arm, a reciprocating mechanism connected with said compressed air valve, and a switch control mechanism for operating said reciprocating mechanism at predetermined times to cause release of the brake and setting of the clutch simultaneously with the closing of the sausage meat control valve to permit said gear mechanisms to cause rotation of the nozzle to twist the sausage casing during the time the sausage meat control valve is closed.

3. The combination with a sausage meat supply pipe, of a sausage twisting machine removably supported thereon comprising a rotatable sausage meat outlet nozzle adapted to have a sausage casing engaged thereon, of a sausage meat control valve positioned between the nozzle and the sausage meat supply pipe, a rotatable control sleeve, means thereon connected to operate said sausage meat control valve, a clutch control arm also formed on said sleeve, a brake control arm connected to be actuated by said sleeve, a brake connected to said brake control arm, a driving mechanism, a clutch positioned between said driving mechanism and said brake, gear means for transmitting a drive from said driving mechanism to said rotatable nozzle, a compressed air control valve connected to operate said brake control bar, a reciprocating mechanism connected with said compressed air valve, and a switch control mechanism for operating said reciprocating mechanism at predetermined times to cause release of the brake and setting of the clutch simultaneously with the closing of the sausage meat control valve to permit said gear mechanisms to cause rotation of the nozzle to twist the sausage casing during the time the sausage meat control valve is closed, a sausage reel mechanism adapted to be operated by the formed sausages, and means controlled thereby for timing the operation of said switch controlled mechanism to cause the sausage casing to be alternately stuffed with sausage meat and then twisted to form a link of sausages.

4. The combination with a sausage meat supply member of a sausage twisting machine removably mounted thereon and comprising a valve housing connected to the end of said sausage meat supply member, a manually controlled sausage meat control valve in said valve housing, a secondary sausage meat control valve in said valve housing adapted to coact with said manually operated valve, a sausage meat outlet nozzle rotatably supported on said valve housing, gear means for rotating said nozzle, said nozzle adapted to have a sausage casing engaged thereover to receive the sausage meat from said nozzle when the valves in said valve housing are positioned to register with one another, a driving means for operating said gear means, a brake device for holding said driving means against operation to prevent rotation of the nozzle during the time sausage meat is fed into the sausage casing, a clutch controlling the operation of said gear means, a rotatable sleeve, an arm thereon for governing the operation of said secondary sausage meat control valve, another arm on said sleeve for governing the operation of said clutch means, a bar for operating said sleeve, a compressed air valve for causing reciprocation of said bar, a reciprocating device for actuating the compressed air valve at predetermined times, and electric control mechanisms for governing the operation of said reciprocating device.

5. A sausage twisting machine comprising a sausage meat control valve, a rotatable nozzle connected therewith adapted to support a sausage casing to receive sausage meat from a supply line when said sausage meat control valve is open, driving means for causing rotation of said nozzle, a control member for governing said driving means and said sausage meat control valve, a compressed air valve connected to cause operation of said control member at predetermined times to cause shutting of the sausage meat control valve simultaneously with rotation of the nozzle by said driving means to cause twisting of the sausage casing, and electrically controlled means for governing the operation of said compressed air valve.

6. A sausage twisting machine comprising a rotatable nozzle, means connected to cause rotation thereof, a valve for governing the flow of sausage meat through said nozzle and into a sausage casing engaged on said nozzle, a solenoid, a switch mechanism governing the operation thereof, a reciprocating bar connected to be operated by said solenoid, a compressed air valve adapted to be controlled by the operation of said reciprocating bar, a pivoted control member, means connecting the same with said compressed air valve to cause closing of the sausage meat valve and operation of the driving mechanisms whereby the nozzle is rotated to cause twisting of the sausage casing when the sausage meat control valve is closed, and means adapted to return the reciprocating bar to normal position to reverse the compressed air valve to cause opening of the sausage meat control valve and simultaneous stopping of the rotation of said nozzle.

7. A sausage twisting machine comprising a rotatable nozzle, means for driving the same, a sausage meat control valve for governing the flow of sausage meat into the nozzle, a member for simultaneously closing said valve and connecting up the driving means so that the nozzle is rotated when the valve is closed, a reciprocating bar for governing the operation of said control member, a valve for governing said reciprocating bar, a reciprocating mechanism for governing said last mentioned valve, a solenoid for operating said reciprocating mechanism in one direction, a switch mechanism for controlling the operation of the solenoid, and means for returning the reciprocating mechanism to a normal position at a predetermined time.

8. A sausage linking machine comprising a valve housing, a manually controlled valve for governing the flow of sausage meat through the housing, a second sausage meat control valve in said housing, a sausage meat outlet nozzle supported on the housing adapted to have a sausage casing removably engaged thereon to receive sausage meat when the valve in said valve housing register with one another, a motor, a clutch, a brake, gears connecting said nozzle with said motor to receive a drive therefrom when the clutch is in and the brake is released, a sleeve, an arm on said sleeve for controlling the clutch, a second arm on said sleeve for controlling the operation of said secondary sausage meat control valve, a reciprocating bar connected to act with a third arm on said sleeve to permit operation of said sleeve, an air valve for operating said bar, a reciprocating mechanism for controlling the operation of the air valve, a solenoid for operating the reciprocating mechanism in one direction, means on one of said driving gears for returning said reciprocating bar to normal position at a predetermined time, a switch mechanism for governing the operation of said solenoid, a sausage feed reel adapted to be rotated by the sausage as it is formed, and means operated by the rotation of the sausage feed reel to govern the operation of said switch mechanism.

9. A sausage twisting machine comprising a rotatable nozzle adapted to have a sausage casing removably engaged thereon, means for automatically controlling the flow of sausage meat through said nozzle into said casing to form sausages, control mechanism for automatically stopping the flow of sausage meat through the nozzle and furthermore causing rotation of the nozzle to cause twisting of the sausage casing at predetermined times, a sausage feed reel, and a switch mechanism operated by the reel for controlling the operation of said control mechanisms.

10. A sausage twisting machine of the class described conmprising a rotatable nozzle, a valve for governing the flow of sausage meat through the nozzle, a control mechanism for automatically closing said valve and rotating said nozzle to cause sausages to be formed, a compressed air valve mechanism for governing the operation of said control mechanism, an electric mechanism for governing the operation of said compressed air valve mechanism, a feed reel operable by the formed sausages, and a commutator mechanism governed by the operation of said feed reel for controlling the operation of said electric mechanism.

11. A sausage twisting machine comprising a housing adapted to feed a supply of sausage meat from any desirable source of supply, primary and secondary sausage meat control valves in said housing, a sausage meat outlet nozzle rotatably mounted on said housing adapted to have a sausage casing engaged thereon and removed therefrom when the casing is being filled with sausage meat, a switch mechanism, a handle for manually causing operation of said primary sausage meat control valve and at the same time causing operation of a part of said switch mechanism, a driving mechanism connected with said nozzle, a control member for operating the secondary sausage meat control valve and governing the operation of said driving mechanisms so that the nozzle is rotated when said secondary sausage meat control valve is closed, a compressed air valve for controlling the operation of said control member, a solenoid for governing the operation of said compressed air valve, a member operable with the operation of said control member for governing the operation of other portions of said switch mechanism, a sausage feed reel, and mechanisms controlled thereby for controlling the operation of said solenoid.

12. A sausage twisting machine comprising a rotatable nozzle, a driving mechanism for rotating the same, a sausage meat feed valve for supplying sausage meat to the nozzle, a switch mechanism for governing the operation of the valve and said driving means, a sausage feed reel, and commutator mechanisms governed by the operation of said feed reel for controlling said switch mechanism.

13. A sausage linking machine comprising a rotatable nozzle, valve means for controlling the flow of sausage meat through the nozzle to stuff a casing carried by the nozzle, driving mechanisms for rotating the nozzle, a solenoid mechanism for controlling the operation of said driving mechanisms, and opening and closing of said valve, a switch mechanism for governing the operation of said solenoid, a commutator mechanism also governing the operation of said solenoid, and a sausage feed reel adapted to be rotated by the sausages for governing the operation of said commutator mechanism.

14. A sausage twisting machine comprising mechanisms for stuffing and twisting a sausage casing, a reel adapted to be rotated by the sausages as they are discharged from the machine, means controlled by the rotation of said reel for governing the operation of said mechanisms, and a stop device operated by said mechanisms for automatically holding the reel against rotation to afford a means for determining the length of the sausages formed.

15. A sausage twisting machine comprising mechanisms for stuffing and twisting a sausage casing, electrical switch means for governing the operation of said mechanisms, a solenoid connected with said switch mechanisms, a commutator mechanism also connected with said solenoid, and means operated by the sausages as they are formed for causing operation of said commutator mechanism.

16. A sausage twisting machine comprising a rotatable nozzle adapted to carry a sausage casing, mechanisms for alternately feeding sausage meat into the casing and twisting the casing to form a link of sausages, a reel adapted to be engaged by said sausages to be rotated thereby, compressed air control means for governing the operation of said mechanisms, a solenoid for governing the operation of said compressed air means, switch mechanisms for governing the operation of said solenoid, and a commutator mechanism controlled by the operation of said reel and connected to also govern the operation of said solenoid.

17. A sausage twisting machine comprising a rotatable nozzle, a valve means for controlling the flow of sausage meat into the nozzle to stuff a sausage casing carried on said nozzle, driving means for causing rotation of said nozzle at predetermined times to cause twisting of the sausage casing, a reel adapted to be rotated by the stuffed sausage casing, means for stopping the reel when the sausage casing is being twisted, electrical switch mechanisms governed by the operation of said reel, and a solenoid controlled by said switch mechanisms for governing the operation of said driving means and said valve means.

18. A sausage twisting machine comprising a rotatable nozzle adapted to have a sausage casing engaged thereon, a sausage meat control valve mechanism for controlling the flow of sausage meat into said nozzle and into the sausage casing, control mechanisms for said valve mechanism, a compressed air valve for governing the operation of said control mechanism, and a solenoid for governing the operation of said compressed air valve mechanism.

19. A sausage twisting machine comprising a rotatable nozzle adapted to carry a sausage casing, driving mechanisms for rotating said nozzle at predetermined times, a control mechanism for controlling the operation of said driving mechanisms, a compressed air valve mechanism for governing the operation of said control mechanism, and a solenoid mechanism for governing the operation of said compressed air valve mechanism.

20. A sausage twisting machine comprising a rotatable nozzle adapted to carry a sausage casing, a drive mechanism connected therewith, a control for said driving mechanism, a compressed air valve for governing the operation of said control, a solenoid for governing the operation of said compressed air mechanism, switch mechanisms for governing the operation of said solenoid, and means carried by said driving mechanism for operating the compressed air control valve in a direction opposite to that performed by the operation of said solenoid.

21. A sausage twisting machine comprising a rotatable nozzle adapted to carry a sausage casing, valve means for governing the flow of sausage meat into the nozzle to cause stuffing of the sausage casing, mechanisms for automatically shutting off the valve mechanism and rotating the nozzle to cause twisting of the sausage casing at predetermined times, a stop device operable by said mechanisms, a reel adapted to be rotated by the sausages, a shaft for supporting said reel, and means carried by said shaft adapted to be moved into engagement with said stop device at predetermined times to hold the reel against rotation during the time the sausage casing is being twisted.

22. In a sausage twisting machine the combination with mechanisms for stuffing and twisting a sausage casing to form a link of sausages, of a solenoid, a plurality of switch mechanisms for governing the operation of said solenoid, means operated by the link of sausages for controlling the operation of one of said switch mechanisms, and mechanisms operated by the solenoid for controlling the operation of the other of said switch mechanisms.

23. In a sausage twisting machine the combination with a sausage meat supply pipe, of a valve housing mounted thereon, a plurality of coacting valves in said valve housing, means for manually opening and closing one of said valves, mechanisms for automatically controlling the operation of the other of said valves, electrical means for governing the operation of said mechanisms, a nozzle on said valve housing adapted to receive sausage meat from said supply pipe when the valves are in open position to permit a sausage casing on said nozzle to be alternately stuffed with the sausage meat and twisted to form a link of sausages, means for operating said nozzle at predetermined times, also governed by said electrical means, and a plurality of mechanisms operated by the formed sausages adapted to control the operation of said electrical means.

24. In combination, a nozzle arranged to receive the casing of a sausage over the free end thereof, means to feed sausage meat under pressure through said nozzle, means to control the flow of meat from said nozzle into said casing and a rotatable element actuated by the filled casing for intermittently operating said valve to control said flow.

25. In combination, a nozzle arranged to receive the casing of a sausage over the free end thereof, means to feed sausage meat under pressure through said nozzle, means to control the flow of meat from said nozzle, means to rotate said nozzle, and a rotatable element actuated by the movement of the filled casing thereover for controlling the flow controlling means and said nozzle rotating means at intervals determined by the length of the sausage passing over said element.

26. In combination, a nozzle designed to receive encasing material over the free end thereof, means to cause the flow of filling material under pressure through said nozzle and into said encasing material, an element arranged to receive and support the filled encasing material and to be actuated by the movement of said material thereover, mechanism for intermittently rotating said nozzle and means actuated by said element to control said mechanism.

27. A sausage linking machine including a rotatable nozzle designed to receive the casing of the sausage over the free end thereof, means to cause the material to flow from said nozzle into the casing and to thereby cause the casing to move away from said nozzle, a valve to control the flow of material through said nozzle, means to rotate said nozzle, a rotatable element arranged in position to receive and support the filled casing as it moves away from said nozzle, said element being mounted so that the movement of the filled casing thereover causes its actuation, and mechanism controlled by said rotatable element for automatically closing said valve and rotating said nozzle in timed relation whereby the length of the links is determined by said rotatable element.

28. A sausage linking machine comprising means to cause the meat to flow into and move the sausage casing away from said means, a movable element arranged in position to receive and support the filled casing and to be moved by and with said filled casing, and mechanism controlled by said movable element for constricting said casing at intervals determined by the movement of the filled casing thereover.

29. In combination, a rotatable tube for stuffing sausage meat into a casing telescoped thereon, a wheel mounted adjacent to said tube in position to be engaged at its periphery and turned by a filled portion of the casing during the time sausage meat is entering the casing, mechanism for stopping the feed of the meat and causing the tube to rotate, and mechanical means mechanically controlled by the rotating movement of said wheel for controlling said mechanism.

30. The combination with a machine adapted to stuff sausage meat into a casing and having mechanism for alternately starting and stopping the feed of a wheel arranged to be rotated by a filled portion of the casing, while the sausage meat is entering the casing, and means controlled by the rotation of said wheel for governing said mechanism.

31. The combination with a machine adapted to stuff sausage meat into a casing and having mechanism for alternately starting and stopping the feed, of a wheel arranged to be rotated by a filled portion of the casing while the sausage meat is entering the casing, and means including a stop actuated by the rotation of said wheel for controlling said mechanism and causing the feed to be interrupted whenever the wheel has turned through a predetermined angle.

32. The combination with a machine adapted to stuff sausage meat into a casing and having mechanism for alternately starting and stopping the feed, of a wheel arranged to be rotated by a filled portion of the casing while the sausage meat is entering the casing, means controlled by said wheel for causing the feed to be interrupted whenever the wheel has turned through a predetermined angle, and means for varying the angle through which the wheel may turn before the feed is stopped.

33. The combination of a sausage filling machine having a tube for receiving a sausage casing, of controlling means including a wheel adapted to be engaged by a filled portion of a casing and be rotated thereby, and a movable support for said controlling means permitting the wheel to be moved from a position in front of the tube into an idle position in which it leaves the space in front of the tube unobstructed.

34. The combination with an open ended hollow spindle free to receive a casing thereon and to permit the casing to project and be pulled therefrom; of mechanism for passing material into the spindle and into the projecting portion of the casing; a wheel positioned to be turned by the filled portion of the casing in passing; and intermittently functioning mechanism for successively marking the portion of the casing passing from the spindle and operated by said wheel in turning.

35. The combination with an open ended hollow spindle free to receive a casing thereon and to permit the casing to project and be pulled therefrom; of mechanism for passing material into the spindle and into the projecting portion of the casing; a wheel positioned to be turned by the material passing from the spindle; and intermittently functioning mechanism for contracting at intervals the portion of the casing passing from the spindle, and operated by the wheel in turning.

36. The combination with an open ended hollow spindle; of mechanism for passing material through said spindle; a wheel positioned to be turned by the material in passing from the spindle; and intermittently functioning mechanism, apart from the wheel, for successively marking the material passing from the spindle and operated by the wheel in turning.

37. The combination with an open ended hollow spindle; of mechanism for passing material through said spindle; a wheel positioned to be turned by the material passing from the spindle; and intermittently functioning mechanism, apart from the wheel, for subdividing the material passing from the spindle and operated by the wheel in turning.

38. The combination with means for guiding the passage of material; of a wheel positioned to be turned by the material in passing; and intermittently functioning mechanism, apart from the wheel, for successively marking the passing material and operated by the wheel in turning.

39. The combination with means for guiding the passage of material; of a wheel positioned to be turned by the material in passing; and intermittently functioning mechanism, apart from the wheel, for subdividing the passing material and operated by the wheel in turning.

40. The combination with means for guiding the passage of encased material; of a wheel positioned to be turned by the encased material in passing; and intermittently functioning mechanism for twisting at intervals the casing containing the material and operated by said wheel in turning.

41. The combination with an open ended hollow spindle free to receive a casing thereon and to permit the casing to project and be pulled therefrom; of mechanism for passing material into the spindle and into the projecting portion of the casing; a wheel positioned to be turned by the material passing from the spindle; and intermittently functioning mechanism for twisting at intervals the portion of the casing passing from the spindle and operated by the wheel in turning.

42. The combination with mechanism for guiding the passage of encased material; of a wheel positioned to be turned by the encased material in passing; and intermittently functioning mechanism for contracting at intervals the casing containing the material and operated by said wheel in turning.

43. The combination with mechanism for marking passing material; of means, including an actuating wheel, turning with reference to the mark applying portion of said mechanism and operating said mechanism, said wheel being operable by the passing material and operating said mechanism in turning.

44. The combination with mechanism for subdividing passing material into spaced apart bodies; of means, including an actuating wheel, operating said mechanism, said wheel being operable by the passing material and operating said mechanism in turning.

45. The combination with mechanism for twisting passing material into spaced apart bodies; of means, including an actuating wheel, operating said mechanism, said wheel being operable by the passing material and operating said mechanism in turning.

46. The combination with mechanism for marking passing material; of means, including an actuating wheel, turning with reference to the mark applying portion of said mechanism and intermittently operating said mechanism, said wheel being operable by the passing material and operating said mechanism in turning.

47. The combination with mechanism for subdividing passing material into spaced apart bodies; of means, including an actuating wheel, intermittently operating said mechanism, said wheel being operable by the passing material and operating said mechanism in turning.

48. The combination with mechanism for twisting passing material; of means, including an actuating wheel, intermittently operating said mechanism, said wheel being operable by the passing material and operating said mechanism in turning.

49. The combination with an open ended hollow spindle free to receive a casing thereon and to permit the casing to project and be pulled therefrom; means for feeding material through said spindle into said casing; a valve for cutting off the flow of the material; intermittently functioning mechanism for operating the valve; and a wheel positioned to be turned by the filled portion of the casing as it moves from the spindle, and operating, in turning, said intermittently functioning mechanism.

50. The combination with an open ended hollow spindle free to receive a casing thereon and to permit the casing to project and be pulled therefrom; means for feeding material through said spindle into said casing; a valve for cutting off the flow of the material; intermittently functioning mechanism for operating the valve; a wheel positioned to be turned by the filled portion of the casing as it moves from the spindle, and operating, in turning, said intermittently functioning mechanism; and mechanism for contracting the casing at intervals as it issues from the spindle and also governed by said intermittently functioning mechanism.

51. The combination with an open ended hollow spindle free to receive a casing thereon and to permit the casing to project and be pulled therefrom; means for feeding material through said spindle into said casing; a valve for cutting off the flow of the material; intermittently functioning mechanism for operating the valve; a wheel positioned to be turned by the filled portion of the casing as it moves from the spindle and operating, in turning, said intermittently functioning mechanism; and mechanism for twisting the casing at intervals as it issues from the spindle and also governed by said intermittently functioning mechanism.

52. The combination with an open ended hollow spindle free to receive a casing thereon and to permit the casing to project and be pulled therefrom; means for feeding material through said spindle into said casing; a valve for cutting off the flow of the material; intermittently functioning mechanism for operating the valve; a wheel positioned to be turned by the filled portion of the casing as it moves from the spindle and operating, in turning, said intermittently functioning mechanism; and mechanism for turning the spindle at intervals to twist the casing as it issues from the spindle and also governed by said intermittently functioning mechanism.

In testimony whereof I have hereunto subscribed my name,

WALTER J. O. JOHNSON.